US 11,339,884 B2

(12) United States Patent
Terao et al.

(10) Patent No.: US 11,339,884 B2
(45) Date of Patent: May 24, 2022

(54) VALVE DEVICE

(71) Applicant: KYB Corporation, Tokyo (JP)

(72) Inventors: Takeshi Terao, Kanagawa (JP); Atsushi Fujii, Nagano (JP); Nobuyoshi Yoshida, Tokyo (JP)

(73) Assignee: KYB CORPORATION, Tokyo (JP)

( * ) Notice: Subject to any disclaimer, the term of this patent is extended or adjusted under 35 U.S.C. 154(b) by 168 days.

(21) Appl. No.: 16/637,608

(22) PCT Filed: Dec. 3, 2018

(86) PCT No.: PCT/JP2018/044392
§ 371 (c)(1),
(2) Date: Feb. 7, 2020

(87) PCT Pub. No.: WO2019/150748
PCT Pub. Date: Aug. 8, 2019

(65) Prior Publication Data
US 2020/0166148 A1 May 28, 2020

(30) Foreign Application Priority Data

Jan. 31, 2018 (JP) .............................. JP2018-015177

(51) Int. Cl.
*F16K 17/02* (2006.01)
*F15B 13/02* (2006.01)
*F15B 13/04* (2006.01)

(52) U.S. Cl.
CPC ............ *F16K 17/02* (2013.01); *F15B 13/024* (2013.01); *F15B 13/0401* (2013.01); *Y10T 137/87885* (2015.04)

(58) Field of Classification Search
CPC .......................... F15B 13/024; F15B 13/0401; F15B 13/0817; F15B 13/0832; F15B 13/0839; F15B 13/0871; F15B 11/00; F15B 2211/50518; F15B 2211/8616; F16K 17/02; Y10T 137/87885
USPC ......................................................... 137/884
See application file for complete search history.

(56) References Cited

U.S. PATENT DOCUMENTS

| | | | | |
|---|---|---|---|---|
| 3,589,387 A | * | 6/1971 | Raymond | ........... F15B 13/0817 137/261 |
| 3,794,066 A | * | 2/1974 | Raymond | ........... F15B 13/0896 137/312 |
| 3,817,269 A | * | 6/1974 | Raymond | ........... F15B 13/0817 137/269 |
| 4,170,214 A | * | 10/1979 | Gill | ..................... F15B 11/0413 137/269 |

(Continued)

FOREIGN PATENT DOCUMENTS

| | | |
|---|---|---|
| EP | 0716234 A2 | 6/1996 |
| JP | H04203033 A | 7/1992 |

(Continued)

*Primary Examiner* — William M McCalister
(74) *Attorney, Agent, or Firm* — Rabin & Berdo, P.C.

(57) ABSTRACT

A valve device includes a relief valve configured to be opened when a pressure in a fluid pressure circuit reaches a predetermined pressure and to relieve a working fluid, a tank passage connected to a tank, a main relief passage connecting the relief valve and the tank passage, and a sub relief passage branching from the main relief passage and connected to the tank passage separately from the main relief passage.

7 Claims, 6 Drawing Sheets

(56) References Cited

U.S. PATENT DOCUMENTS

| | | | | |
|---|---|---|---|---|
| 4,691,795 A | * | 9/1987 | Wehmeyer | B60K 17/356 |
| | | | | 137/884 |
| 5,533,334 A | * | 7/1996 | Takeuchi | F15B 13/0896 |
| | | | | 60/426 |
| 5,778,930 A | | 7/1998 | Friedrichsen et al. | |
| 6,257,277 B1 | * | 7/2001 | McGeachy | F15B 11/028 |
| | | | | 137/599.08 |
| 2004/0211471 A1 | * | 10/2004 | Toji | F15B 13/0896 |
| | | | | 137/596 |
| 2010/0101662 A1 | * | 4/2010 | Buttner | F15B 13/0871 |
| | | | | 137/334 |
| 2015/0107712 A1 | * | 4/2015 | Kobayashi | F15B 13/0842 |
| | | | | 137/884 |
| 2016/0317956 A1 | * | 11/2016 | Schneider | E02F 9/2239 |

FOREIGN PATENT DOCUMENTS

| | | |
|---|---|---|
| JP | H06-137302 A | 5/1994 |
| JP | 2008-014405 A | 1/2008 |
| JP | 2013-249896 A | 12/2013 |

* cited by examiner

US 11,339,884 B2

VALVE DEVICE

TECHNICAL FIELD

The present invention relates to a valve device.

BACKGROUND ART

A valve device in which a relief valve is provided is known (see JPH06-137302A). The relief valve has a function of being opened when a pressure in a circuit reaches a set value so as to return a working fluid to a tank and to prevent the pressure in the circuit from rising to the set value or more.

SUMMARY OF INVENTION

In the relief valve as described above, when the working fluid is relieved from the relief valve, there is a concern that a noise is generated.

The present invention has an object to prevent generation of a noise when the working fluid is relieved from the relief valve.

According to one aspect of the present invention, a valve device includes a relief valve configured to be opened when a pressure in a fluid pressure circuit reaches a predetermined pressure and to relieve a working fluid, a tank passage connected to a tank, a main relief passage connecting the relief valve and the tank passage, and a sub relief passage branching from the main relief passage and connected to the tank passage separately from the main relief passage.

DESCRIPTION OF EMBODIMENTS

First Embodiment

A valve device 100 according to a first embodiment of the present invention will be described by referring to FIGS. 1 to 5B. In the following, the valve device 100 provided in a fluid pressure control system 101 configured to be used for a construction machine or particularly for a hydraulic excavator and to control a flow of a working fluid supplied to/discharged from a fluid pressure actuator will be described as an example.

Figure 1:
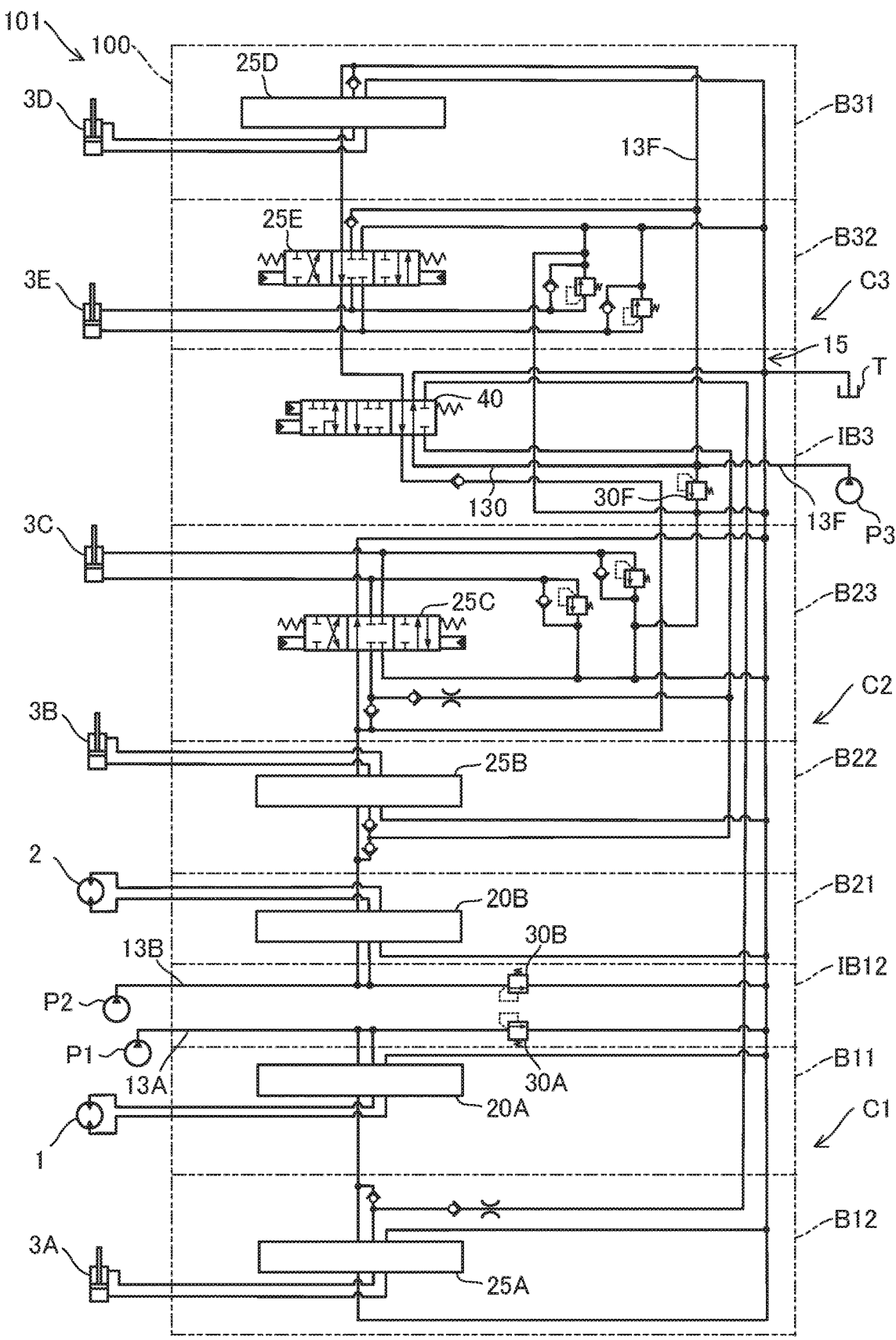
FIG. 1 is a schematic view illustrating a configuration of a fluid pressure control system including a valve device according to a first embodiment of the present invention.

By referring to FIG. 1, entire configuration of the fluid pressure control system 101 including the valve device 100 will be described. FIG. 1 is a schematic view illustrating the configuration of the fluid pressure control system 101 including the valve device 100.

The fluid pressure control system 101 includes a plurality of pumps (a first pump P1, a second pump P2, and a third pump P3) that is driven by an engine (not shown) or a motor (not shown) and that discharge a working oil as a working fluid, a tank T that stores the working oil, a first running motor 1 and a second running motor 2 as actuators that drive a crawler-type pair of right and left running devices (not shown), hydraulic cylinders 3A, 3B, 3C, 3D, and 3E as actuators that drive driving targets (not shown) such as a boom, an arm, a bucket, a blade and the like, and the valve device 100 that controls operations of the first running motor 1, the second running motor 2, and the hydraulic cylinders 3A, 3B, 3C, 3D, and 3E.

The valve device 100 includes a first circuit system C1 as a fluid pressure circuit connected to the first pump P1 and to which the working oil is supplied from the first pump P1, a second circuit system C2 as a fluid pressure circuit connected to the second pump P2 and to which the working oil is supplied from the second pump P2, and a third circuit system C3 as a fluid pressure circuit connected to the third pump P3 and to which the working oil is supplied from the third pump P3.

The first circuit system C1 includes a first main passage 13A that leads the working oil discharged from the first pump P1, a first running control valve 20A as a control valve that is provided in the first main passage 13A and that controls a flow of the working oil supplied to/discharged from the first running motor 1, and a cylinder control valve 25A as a control valve that is provided in the first main passage 13A closer to a downstream than the first running control valve 20A and that controls the flow of the working oil supplied to/discharged from the hydraulic cylinder 3A.

A first main relief valve 30A as a main relief valve or a relief valve that protects hydraulic devices of the first circuit system C1 is provided on an upstream side of each of the control valves 20A and 25A in the first main passage 13A. The first main relief valve 30A is opened when a pressure in the first circuit system C1 reaches a predetermined main relief pressure and keeps the pressure in the first circuit system C1 at a predetermined main relief pressure by relieving the working oil. That is, the first main relief valve 30A regulates a highest pressure of the first circuit system C1, that is, the highest pressure of the working oil discharged from the first pump P1.

The second circuit system C2 includes a second main passage 13B that leads the working oil discharged from the second pump P2, a second running control valve 20B as a control valve that is provided in the second main passage 13B and that controls a flow of the working oil supplied to/discharged from the second running motor 2, a cylinder control valve 25B as a control valve that is provided in the second main passage 13B closer to the downstream than the second running control valve 20B and that controls the flow of the working oil supplied to/discharged from the hydraulic cylinder 3B, and a cylinder control valve 25C that is provided in the second main passage 13B closer to the downstream than the cylinder control valve 25B and that controls the flow of the working oil supplied to/discharged from the hydraulic cylinder 3C.

A second main relief valve 30B as a main relief valve or a relief valve that protects hydraulic devices of the second circuit system C2 is provided on an upstream side of each of the control valves 20B, 25B, and 25C in the second main passage 13B. The second main relief valve 30B is opened when a pressure in the second circuit system C2 reaches a predetermined main relief pressure and keeps the pressure in the second circuit system C2 at the predetermined main relief pressure by relieving the working oil. That is, the second main relief valve 30B regulates a highest pressure of the second circuit system C2, that is, the highest pressure of the working oil discharged from the second pump P2.

The third circuit system C3 includes a third main passage 13F that leads the working oil discharged from the third pump P3, a merging passage 130 branching from the third main passage 13F, a cylinder control valve 25D as a control valve that is provided in the third main passage 13F and that controls a flow of the working oil supplied to/discharged from the hydraulic cylinder 3D, a cylinder control valve 25E as a control valve that is provided in the third main passage 13F closer to the downstream than the cylinder control valve 25D and that controls the flow of the working oil supplied to/discharged from the hydraulic cylinder 3E, and a communication valve 40 that is provided in the third main passage 13F closer to the downstream than the cylinder control valve 25E and that controls merging and shut-off of the working oil in the third circuit system C3 to the first circuit system C1 and the second circuit system C2.

A third main relief valve 30F as a main relief valve or a relief valve that protects hydraulic devices of the third circuit system C3 is provided on the upstream side of each of the control valves 25D, 25E, and the communication valve 40 in the third main passage 13F. The third main relief valve 30F is opened when a pressure in the third circuit system C3 reaches a predetermined main relief pressure and keeps the pressure in the third circuit system C3 at the predetermined main relief pressure by relieving the working oil. That is, the third main relief valve 30F regulates a highest pressure of the third circuit system C3, that is, the highest pressure of the working oil discharged from the third pump P3.

The valve device 100 in which each of the control valves 20A, 20B, 25A, 25B, 25C, 25D, and 25E and the communication valve 40 are provided is constituted by connecting a plurality of blocks. The valve device 100 has an inlet block IB12 that takes in the working oil discharged from the first pump P1 and the working oil discharged from the second pump P2, a valve block B11 in which the first running control valve 20A is provided, a valve block B12 in which the cylinder control valve 25A is provided, a valve block B21 in which the second running control valve 20B is provided, a valve block B22 in which the cylinder control valve 25B is provided, a valve block B23 in which the cylinder control valve 25C is provided, an inlet block IB3 in which the communication valve 40 is provided and that takes in the working oil discharged from the third pump P3, a valve block B31 in which the cylinder control valve 25D is provided, and a valve block B32 in which the cylinder control valve 25E is provided.

The inlet blocks IB12 and IB3 are main blocks of the present invention, and the valve blocks B11, B12, B21, B22, B23, B31, and B32 are sub blocks of the present invention.

In the valve device 100, the valve block B31, the valve block B32, the inlet block IB3, the valve block B23, the valve block B22, the valve block B21, the inlet block IB12, the valve block B11, and the valve block B12 are aligned in this order. Each block is connected to the adjacent block.

That is, the valve device 100 has a stacked structure in which the plurality of blocks is stacked.

Figure 2:
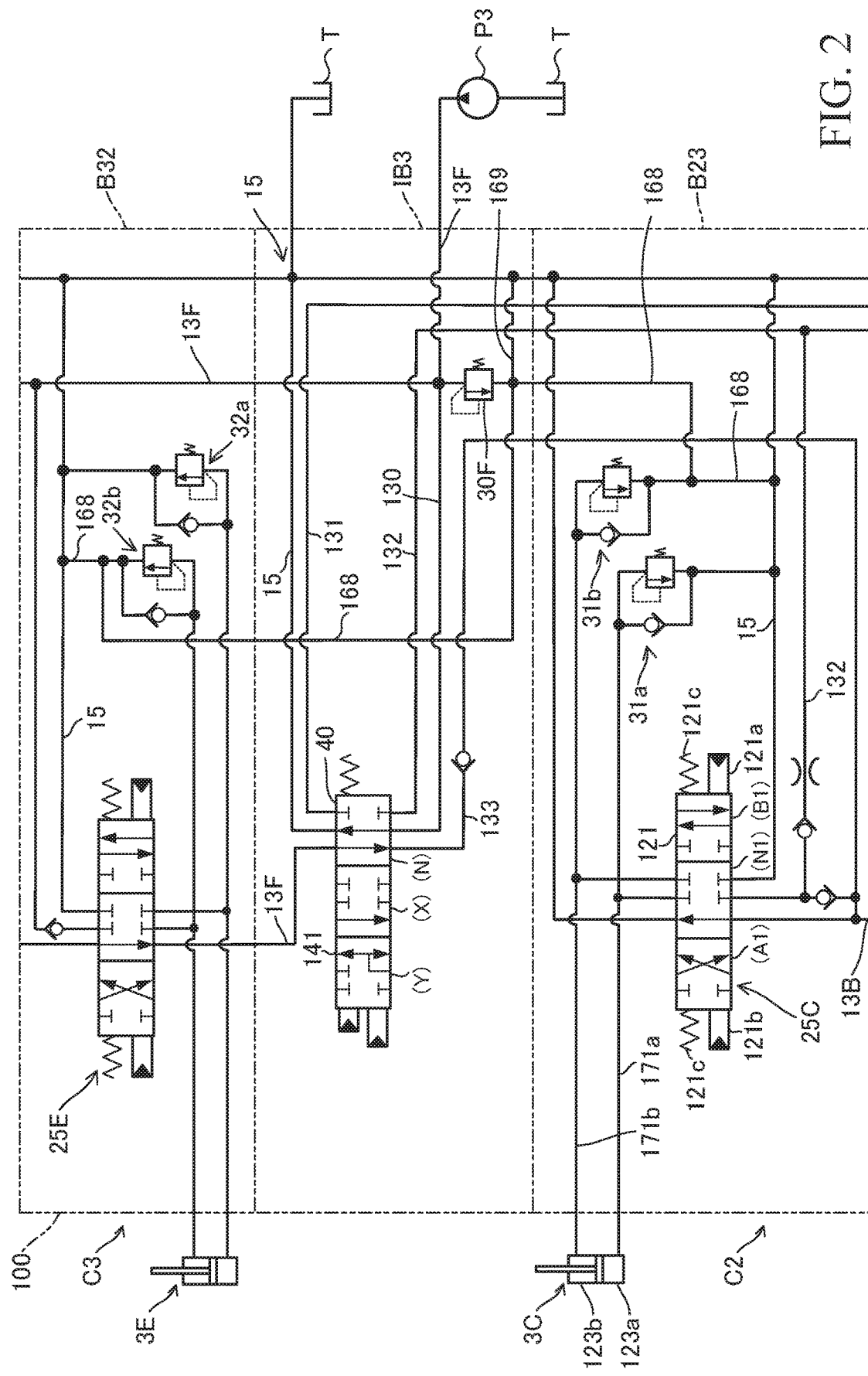
FIG. 2 is a partially enlarged view of FIG. 1 and illustrates hydraulic circuits of a valve block B32, an inlet block IB3, and a valve block B23 of the valve device according to the first embodiment of the present invention.

The valve block B32, the inlet block IB3, and the valve block B23 will be described in detail by referring to FIG. 2. FIG. 2 is a partially enlarged view of FIG. 1 and illustrates hydraulic circuits of the valve block B32, the inlet block IB3, and the valve block B23 of the valve device 100.

The communication valve 40 and the third main relief valve 30F are assembled into a valve housing of the inlet block IB3.

The communication valve 40 is a hydraulic-pilot type directional switching valve that switches a spool 141 to any one of a neutral position (N), a first communication position (X), and a second communication position (Y). When the spool 141 of the communication valve 40 is at the neutral position (N), the merging passage 130 for branching from the third main passage 13F and a tank passage 15 connected to the tank T communicate with each other. Thus, when the communication valve 40 is at the neutral position (N), the working oil discharged from the third pump P3 is discharged as it is to the tank T through the communication valve 40 and the tank passage 15. That is, when the communication valve 40 is at the neutral position (N), the third pump P3 is in an unload state.

When the spool 141 of the communication valve 40 is at the first communication position (X), the third main passage 13F and a third merging passage 133 connected to an upstream side of the cylinder control valve 25C of the second circuit system C2 communicate with each other. That is, when being at the first communication position (X), the communication valve 40 can merge the working oil discharged from the third pump P3 into the working oil supplied from the second pump P2 to the cylinder control valve 25C. When the spool 141 of the communication valve 40 is at the first communication position (X), communication between the merging passage 130 and the tank passage 15 is shut off.

When the spool 141 of the communication valve 40 is at the second communication position (Y), the merging passage 130 branching from the third main passage 13F, a first merging passage 131 connected to the upstream side of the cylinder control valve 25A of the first circuit system C1, and a second merging passage 132 connected to the upstream side of the cylinder control valve 25B of the second circuit system C2 and the upstream side of the cylinder control valve 25C communicate with each other. That is, when being at the second communication position (Y), the communication valve 40 can merge the working oil discharged from the third pump P3 into the working oil supplied from the first pump P1 to the cylinder control valve 25A and can merge the working oil discharged from the third pump P3 into the working oil supplied from the second pump P2 to the cylinder control valve 25B and the cylinder control valve 25C.

The cylinder control valve 25C and overload relief valves 31$a$ and 31$b$ with makeup as overload relief valves are assembled into the valve housing of the valve block B23.

The cylinder control valve 25C is a hydraulic-pilot type directional switching valve that switches a spool 121 to any one of a neutral position (N1), an extended position (A1), and a contracted position (B1).

The cylinder control valve 25C includes a pilot chamber 121$a$ into which a pilot pressure for switching the spool 121 to the extended position (A1) is input, a pilot chamber 121$b$ into which a pilot pressure for switching the spool 121 to the contracted position (B1) is input, and a centering spring 121$c$ for switching the spool 121 to the neutral position (N).

A predetermined pilot pressure is led to the pilot chambers 121a and 121b in accordance with an operation of an operation lever (not shown) corresponding to the hydraulic cylinder 3C. When the operation lever corresponding to the hydraulic cylinder 3C is operated to an extension direction, the pilot pressure according to an operation amount is led to the pilot chamber 121a, and the spool 121 of the cylinder control valve 25C is switched to the extended position (A1). As a result, the second main passage 13B is shut off, and the working oil supplied from a parallel passage branching from the second main passage 13B and the second merging passage 132 is led to a bottom-side chamber 123a of the hydraulic cylinder 3C, and the working oil in the rod-side chamber 123b is discharged to the tank T through the tank passage 15. As a result, the hydraulic cylinder 3C is extended/operated.

When the operation lever corresponding to the hydraulic cylinder 3C is operated in the contracting direction, the pilot pressure according to the operation amount is led to the pilot chamber 121b, and the spool 121 of the cylinder control valve 25C is switched to the contracted position (B1). As a result, the second main passage 13B is shut off, and the working oil supplied from the parallel passage branching from the second main passage 13B and the second merging passage 132 is led to the rod-side chamber 123b of the hydraulic cylinder 3C, and the working oil in the bottom-side chamber 123a is discharged to the tank T through the tank passage 15. As a result, the hydraulic cylinder 3C is contracted/operated.

When the operation lever corresponding to the hydraulic cylinder 3C is operated to the neutral position, the pair of pilot chambers 121a and 121b is connected to the tank T, and the spool 121 is switched to the neutral position (N1) by the pair of centering springs 121c. As a result, supply/discharge of the working oil with respect to the hydraulic cylinder 3C is shut off, the hydraulic cylinder 3C is brought into a load holding state.

The overload relief valve 31a with makeup is connected to a bottom-side passage 171a connecting the bottom-side chamber 123a of the hydraulic cylinder 3C and the cylinder control valve 25C. The overload relief valve 31b with makeup is connected to the rod-side passage 171b connecting the rod-side chamber 123b of the hydraulic cylinder 3C and the cylinder control valve 25C.

The overload relief valve 31a with makeup has a relief valve that is opened when the pressure of the bottom-side passage 171a (a load pressure of the hydraulic cylinder 3C) reaches a predetermined relief pressure and that keeps the pressure of the bottom-side passage 171a at a predetermined relief pressure by relieving the working oil through a sub relief passage 168 which will be described later and the tank passage 15 and a check valve (suction valve) that allows only a flow of the working oil from the tank T toward the bottom side chamber 123a. That is, the overload relief valve 31a with makeup has a function of regulating a highest pressure of the bottom-side passage 171a and a function of suppressing the bottom-side passage 171a from becoming a negative pressure.

The overload relief valve 31b with makeup has a relief valve that is opened when the pressure in the rod-side passage 171b (a load pressure of the hydraulic cylinder 3C) reaches the predetermined relief pressure and that keeps the pressure of the rod-side passage 171b at the predetermined relief pressure by relieving the working oil through the sub relief passage 168 which will be described later and the tank passage 15 and a check valve (suction valve) that allows only the flow of the working oil from the tank T toward the rod-side chamber 123b. That is, the overload relief valve 31b with makeup has a function of regulating a highest pressure of the rod-side passage 171b and a function of suppressing the rod-side passage 171b from becoming a negative pressure.

The cylinder control valve 25E and the overload relief valves 32a and 32b with makeup as the overload relief valves are assembled into the valve housing of the valve block B32.

Since the operations and functions of the cylinder control valve 25E and the overload relief valves 32a and 32b with makeup are similar to those of the cylinder control valve 25C and the overload relief valves 31a and 32b with makeup, the description will be omitted.

Figure 3:
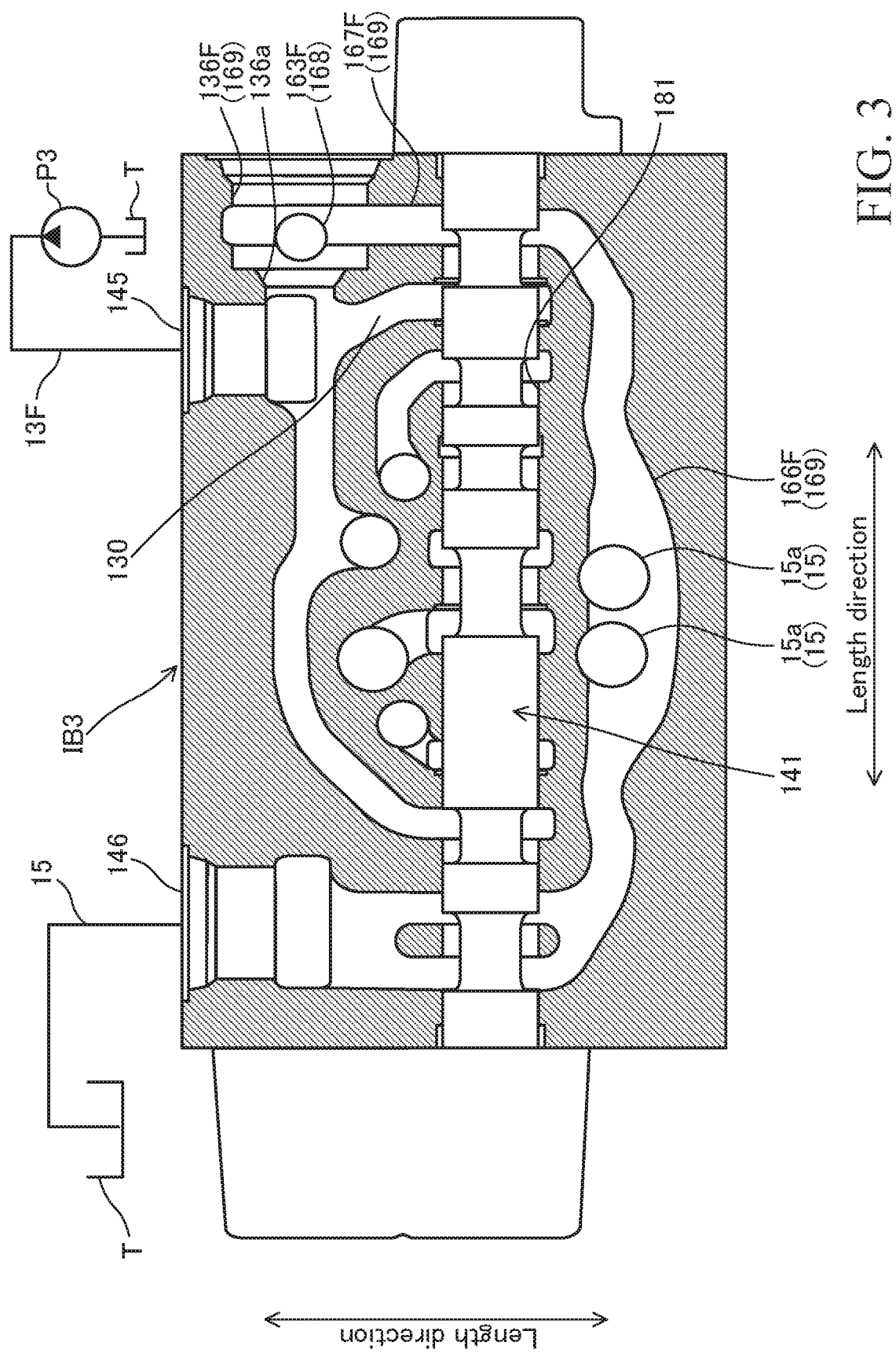
FIG. 3 is a longitudinal sectional view of the inlet block IB3 of the valve device according to the first embodiment of the present invention and illustrates a state where a spool of a communication valve is at a neutral position.
Figure 4:
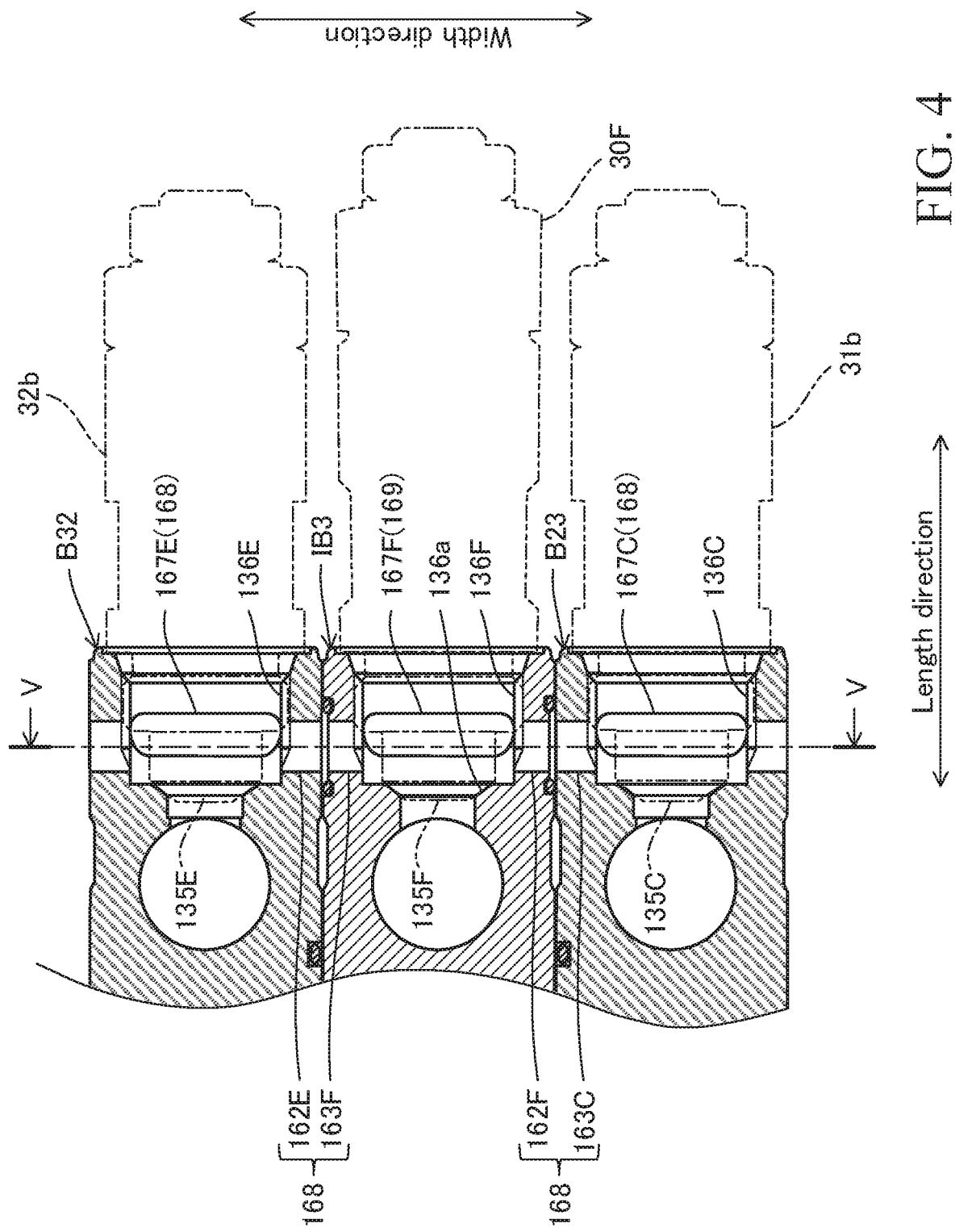
FIG. 4 is a transverse sectional view of the valve device according to the first embodiment of the present invention.
Figure 5A:
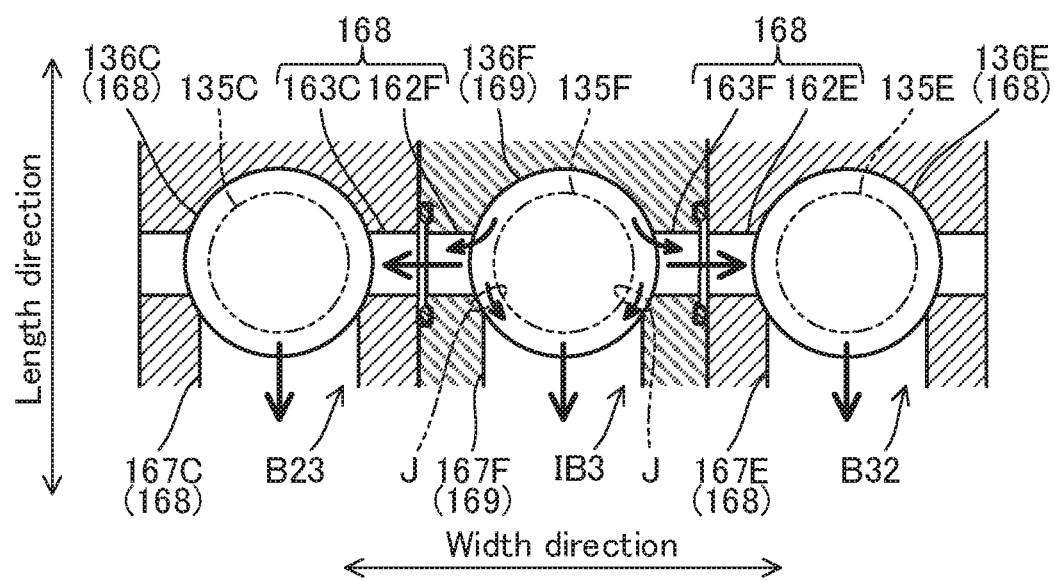
FIG. 5A is a sectional view along a V-V line in FIG. 4.

Hereinafter, configuration of each passage that leads the working oil relieved from the third main relief valve 30F of the valve device 100 to the tank T will be described in detail by referring to FIGS. 3 to 5B. FIG. 3 is a longitudinal sectional view of the inlet block IB3 and illustrates a state where the spool 141 of the communication valve 40 is at the neutral position (N). FIG. 4 is a transverse sectional view of the valve device 100. In FIG. 4, the third main relief valve 30F, the overload relief valve 31b with makeup, and the overload relief valve 32b with makeup are indicated by a two-dot chain line. FIG. 5A is a sectional view along a V-V line in FIG. 4.

The valve housing of each of the blocks IB3, B23, and B32 has a cuboid shape, respectively, and as illustrated in FIG. 4, is stacked/disposed in one direction and fixed in a state where wider side surfaces of the adjacent blocks are in contact with each other.

As illustrated in FIG. 3, the inlet block IB3 is formed to include a spool accommodating hole 181 into which the spool 141 is slidably inserted, a pump port 145 connected to the third main passage 13F to which the working oil from the third pump P3 is led, a tank port 146 connected to the tank passage 15 that leads the working oil to the tank T, a main relief passage 169 connected to the third main relief valve 30F, and a sub relief passage 168 connected to the tank passage 15 separately from the main relief passage 169.

Hereinafter, description will be made by assuming a stacking direction of each block to be a width direction, a center axis direction of the spool 141 orthogonal to the width direction (that is, a moving direction of the spool 141) to be a length direction, and a direction orthogonal to the aforementioned width direction and the aforementioned length direction to be a height direction for convenience of the description. Moreover, a vertical direction of the valve device 100 is regulated with a surface of the inlet block IB3 on which the pump port 145 and the tank port 146 are provided assumed to be an upper surface, and a surface on the opposite side to be a lower surface.

As illustrated in FIGS. 3 and 4, the inlet block IB3 is formed to include a first connecting portion 166F and a second connecting portion 167F connected to the tank passage 15, an accommodating portion 136F as a first accommodating portion in which a valve element 135F of the third main relief valve 30F is accommodated, and through holes 162F and 163F connected to the accommodating portion 136F. The first connecting portion 166F extends in the length direction on a lower surface side of the inlet block IB3. The second connecting portion 167F extends in the height direction of the inlet block IB3 and connects the accommodating portion 136F and the first connecting portion 166F. The accommodating portion 136F, the first connecting portion 166F, and the second connecting portion 167F constitute the main relief passage 169. A channel sectional area of the second connecting portion 167F is smaller than the channel sectional area of the first connecting portion 166F. Moreover, the through holes 162F and 163F constitute a part of the sub relief passage 168.

As illustrated in FIG. 4, the accommodating portion 136F forms a substantially columnar accommodation space accommodating the valve element 135F. The accommodating portion 136F is formed with a seat portion 136a on which the valve element 135F of the third main relief valve 30F is seated. The third main relief valve 30F has a spring (not shown) that biases the valve element 135F in a direction where the valve element 135F is seated on the seat portion 136a.

When a discharge pressure of the third pump P3 becomes the main relief pressure set by the spring or more, the valve element 135F leaves the seat portion 136a against the biasing force of the spring. That is, the third main relief valve 30F is opened. As a result, the working oil discharged from the third pump P3 is discharged to the tank T through the third main relief valve 30F.

When the discharge pressure of the third pump P3 becomes less than the main relief pressure, the valve element 135F is seated on the seat portion 136a by the biasing force of the spring. That is, the third main relief valve 30F is closed.

A through hole 15a is formed at a center part in the length direction of the first connecting portion 166F of the inlet block IB3. The through hole 15a is extended along the width direction of the inlet block IB3. The through hole (not shown) is also formed in the valve blocks B23 and B32 adjacent to the inlet block IB3 similarly to the inlet block IB3, and the through hole 15a of the inlet block IB3 and the through holes of the valve blocks B23 and B32 are faced with each other, respectively. The through hole 15a of the inlet block IB3 and the through holes of the valve blocks B23 and B32 constitute a part of the tank passage 15 of the valve device 100.

The through hole 162F of the inlet block IB3 is formed so as to be opened in one of side surfaces in the width direction in the inlet block IB3. The through hole 162F is connected from the side surface in the width direction abutting on the valve block B23 in the inlet block IB3 to the accommodating portion 136F and extends in the width direction of the inlet block IB3. The through hole 163F is formed so as to be opened in the other side surface in the inlet block IB3. The through hole 163F is connected from the side surface in the width direction abutting on the valve block B32 in the inlet block IB3 to the accommodating portion 136F and extends in the width direction of the inlet block IB3.

The valve block B23 is formed to include a first connecting portion (not shown) connected to the tank passage 15, a second connecting portion 167C connected to this first connecting portion, an accommodating portion 136C as a second accommodating portion in which the valve element 135C of the overload relief valve 31b with makeup is accommodated, and a through hole 163C connected to the accommodating portion 136C. Similarly to the inlet block IB3, the first connecting portion extends in the length direction on the lower surface side of the valve block B23. The second connecting portion 167C extends in the height direction of the valve block B23 and connects the accommodating portion 136C and the first connecting portion. The accommodating portion 136C, the first connecting portion, the second connecting portion 167C, and the through hole 163C constitute a part of the sub relief passage 168. The channel sectional area of the second connecting portion 167C is smaller than the channel sectional area of the first connecting portion.

The through hole 163C of the valve block B23 is formed so as to be opened in the side surface in the width direction in the valve block B23. The through hole 163C is connected from the side surface in the width direction abutting on the inlet block IB3 in the valve block B23 to the accommodating portion 136C and extends in the width direction of the valve block B23.

The valve block B32 is formed to include a first connecting portion (not shown) connected to the tank passage 15, a second connecting portion 167E connected to this first connecting portion, an accommodating portion 136E as a second accommodating portion in which the valve element 135E of the overload relief valve 32b with makeup is accommodated, and a through hole 162E connected to the accommodating portion 136E. Similarly to the inlet block IB3, the first connecting portion extends in the length direction on the lower surface side of the valve block B32. The second connecting portion 167E extends in the height direction of the valve block B32 and connects the accommodating portion 136E and the first connecting portion. The accommodating portion 136E, the first connecting portion, the second connecting portion 167E, and the through hole 162E constitute a part of the sub relief passage 168. The channel sectional area of the second connecting portion 167E is smaller than the channel sectional area of the first connecting portion.

The through hole 162E of the valve block B32 is formed so as to be opened in the side surface in the width direction in the valve block B32. The through hole 162E is connected from the side surface in the width direction abutting on the inlet block IB3 in the valve block B32 to the accommodating portion 136E and extends in the width direction of the valve block B32.

The through hole 162F of the inlet block IB3 and the through hole 163C of the valve block B23 are formed at positions faced with each other and are connected to each other. Moreover, the through hole 163F of the inlet block IB3 and the through hole 162E of the valve block B32 are formed at positions faced with each other and are connected to each other.

The through hole 162F of the inlet block IB3 and the through hole 163C of the valve block B23 and the through hole 163F of the inlet block IB3 and the through hole 162E of the valve block B32 form a part of the sub relief passage 168. That is, the sub relief passages 168 is formed over the inlet block IB3 and the valve block B23 and formed over the inlet block IB3 and the valve block B32.

Here, if the working oil relieved from the third main relief valve 30F is to be led to the tank passage 15 only through the main relief passage 169, there is a concern that a noise can occur due to a high flow velocity of the working oil flowing through the main relief passage 169.

Since the inlet block IB3 including the communication valve 40 controls merging and shut-off of the working oil in each of the circuit systems C1, C2, and C3, the passages can become complicated more easily than the other blocks. Thus, when the inlet block IB3 is to be equal in size to each block, it is difficult to ensure the channel sectional area of the main relief passage 169. Moreover, a flowrate of the working oil relieved by the third main relief valve 30F for circuit protection is larger than the flowrates of the working oil relieved by the overload relief valves 31a, 31b, 32a, and 32b with makeup. Thus, in the third main relief valve 30F of the inlet block IB3, there is a greater concern that the noise can occur at relief as compared with the overload relief valves 31a, 31b, 32a, and 32b with makeup of the other valve blocks B23 and B32.

Figure 5B:
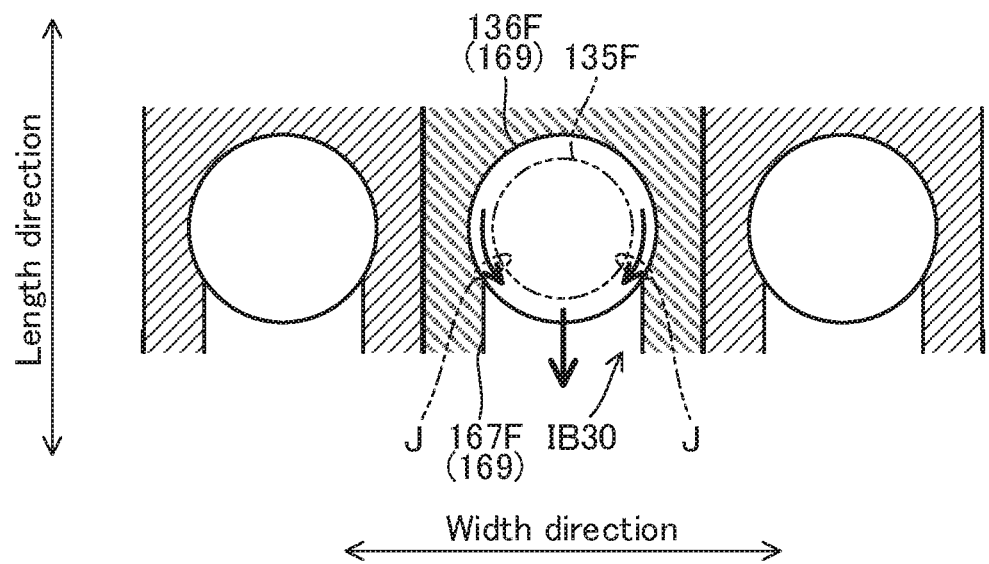
FIG. 5B is a sectional view of the valve device according to a comparative example of the first embodiment of the present invention.

Moreover, if the number of passages to be connected to the tank T on the downstream side of the third main relief valve 30F is one (that is, in the case of only the main relief passage 169), there is also a concern that a noise can occur due to the flow of the working oil between the valve element 135F and the accommodating portion 136F. FIG. 5B is a diagram corresponding to FIG. 5A and is a sectional view of a valve device according to a comparative example of this embodiment.

As schematically indicated by an arrow in FIG. 5B, when the third main relief valve 30F of the inlet block IB 30 is opened, all the working oil that flows into an annular gap between the valve element 135F and the accommodating portion 136F flows toward the main relief passage 169. That is, the working oil having flowed into the accommodating portion 136F flows toward the lower surface side of the inlet block IB30. Since the flow of the working oil is generated concentratedly in one direction, the flow velocity of the working oil flowing toward the lower surface side through the annular gap between the valve element 135F and the accommodating portion 136F becomes particularly large in the vicinity of an inlet of the main relief passage 169 (J part in illustration), and there is a concern of occurrence of a noise.

On the other hand, the valve device 100 according to this first embodiment, as illustrated in FIGS. 2 to 5A, is provided with the sub relief passage 168 branching from the main relief passage 169 connecting the third main relief valve 30F and the tank passage 15 and connecting the third main relief valve 30F and the tank passage 15 separately from the main relief passage 169. The sub relief passage 168 of the inlet block IB3 is connected to the sub relief passage 168 of the valve block B23 and the sub relief passage 168 of the valve block B32. That is, the main relief passage 169 is connected to the tank passage 15 through the sub relief passage 168.

Therefore, in this first embodiment, the working oil that is relieved from the third main relief valve 30F is separated from the accommodating portion 136F to three discharge systems and is led to the tank passage 15. In the first discharge system, the working oil flows in the order of the main relief passage 169 (the accommodating portion 136F, the second connecting portion 167F, and the first connecting portion 166F) and the tank passage 15. In the second discharge system, the working oil flows in the order of the main relief passage 169 (the accommodating portion 136F), the sub relief passage 168 (the through hole 162F, the through hole 163C of the valve block B23, the accommodating portion 136C of the valve block B23, the second connecting portion 167C of the valve block B23, and the first connecting portion of the valve block B23), and the tank passage 15. In the third discharge system, the working oil flows in the order of the main relief passage 169 (the accommodating portion 136F), the sub relief passage 168 (the through hole 163F, the through hole 162E of the valve block B32, the accommodating portion 136E of the valve block B32, the second connecting portion 167E of the valve block B32, and the first connecting portion of the valve block B32) and the tank passage 15.

That is, as schematically indicated by an arrow in FIG. 5A, when the third main relief valve 30F is opened, a part of the working oil having flowed in through the annular gap between the accommodating portion 136F and the valve element 135F is led to the accommodating portion 136C of the valve block B23, another part is led to the accommodating portion 136E of the valve block B32, and the remainder is led to the second connecting portion 167F constituting the main relief passage 169 of the inlet block IB3. As a result, as compared with a case where the through holes 162F, 163C, 163F, and 162E are not formed (see FIG. 5B), the flowrate of the working fluid passing by the vicinity of the inlet (the J part in the illustration) of the second connecting portion 167F of the main relief passage 169 is reduced, and the flow velocity of the working oil in the vicinity of the inlet (the J part in the illustration) of the second connecting portion 167F can be reduced. As a result, occurrence of a noise in the vicinity of the inlet (the J part in the illustration) of the second connecting portion 167F of the main relief passage 169 can be prevented. That is, occurrence of a noise in the main relief passage 169 can be prevented.

According to the aforementioned embodiment, the following working effects are exerted.

(1) The inlet block IB3 of the valve device 100 is provided with the main relief passage 169 connecting the third main relief valve 30F and the tank passage 15 and the sub relief passage 168 branching from the main relief passage 169 and connecting the third main relief valve 30F and the tank passage 15 separately from the main relief passage 169. As a result, as compared with the case where the sub relief passage 168 is not provided, a total sectional area of the channel through which the working oil relieved from the third main relief valve 30F flows can be made larger. Thus, even if the channel sectional area of the second connecting portion 167F in the main relief passage 169 cannot be formed with a size equal to that of the first connecting portion 166F, that is, even if the channel sectional area of the second connecting portion 167F is smaller than the first connecting portion 166F, the flow velocity of the relieved working oil can be reduced. As a result, occurrence of a noise when the third main relief valve 30F is relieved can be prevented. Particularly, the flowrate of the working oil relieved from the third main relief valve 30F is larger than the flowrates of the working oil relieved from the overload relief valves 31a, 31b, 32a, and 32b with makeup. Thus, a noise of the valve device 100 can be reduced by preventing occurrence of a noise when the third main relief valve 30F is relieved.

(2) A part of the working oil that is relieved from the third main relief valve 30F was led from the sub relief passage 168 of the inlet block IB3 to the sub relief passage 168 of the valve block B23 adjacent to the inlet block IB3. Moreover, a part of the working oil that is relieved from the third main relief valve 30F was led to the sub relief passage 168 of the valve block B32 adjacent to the inlet block IB3 through the sub relief passage 168 of the inlet block IB3. As a result, the working oil that is relieved from the third main relief valve 30F can be discharged to the tank passage 15 through the sub relief passage 168 of the valve blocks B23 and B32 adjacent to the inlet block IB3. Thus, since there is no need to newly provide a plurality of passages directly connecting the third main relief valve 30F and the tank T in the inlet block IB3, a size increase of the inlet block IB3 can be prevented. Therefore, according to this embodiment, while size reduction of the inlet block IB3 is realized, occurrence of a noise when the third main relief valve 30F is relieved can be prevented.

(3) In this embodiment, the sub relief passage 168 is connected to the accommodating portion 136C accommodating the valve element 135C of the overload relief valve 31b with makeup. Moreover, the sub relief passage 168 is connected to the accommodating portion 136E accommodating the valve element 135E of the overload relief valve 32b with makeup. Thus, the working oil that is relieved from the overload relief valves 31b and 32b with makeup of the valve blocks B23 and B32 can be discharged through the main relief passage 169 on the downstream side of the third main relief valve 30F of the inlet block IB3. Therefore, according to this embodiment, occurrence of a noise when the overload relief valves 31b and 32b with makeup is relieved can be also prevented.

(4) The sub relief passage 168 can be formed only by forming the through holes 162F, 163C, 163F, and 162E connected in the width direction of the valve device 100. As a result, since the sub relief passage 168 can be formed easily without a labor in machining, a manufacturing cost can be reduced. Moreover, since the sub relief passage 168 extends in the width direction, an influence on the other structures in the valve device 100 is small.

Second Embodiment

A valve device 200 according to a second embodiment of the present invention will be described by referring to FIG. 6. In the following, differences from the aforementioned first embodiment will be mainly described, and the same configuration as the configuration described in the aforementioned first embodiment or corresponding configuration is given the same reference numerals and the description will be omitted.

Figure 6:
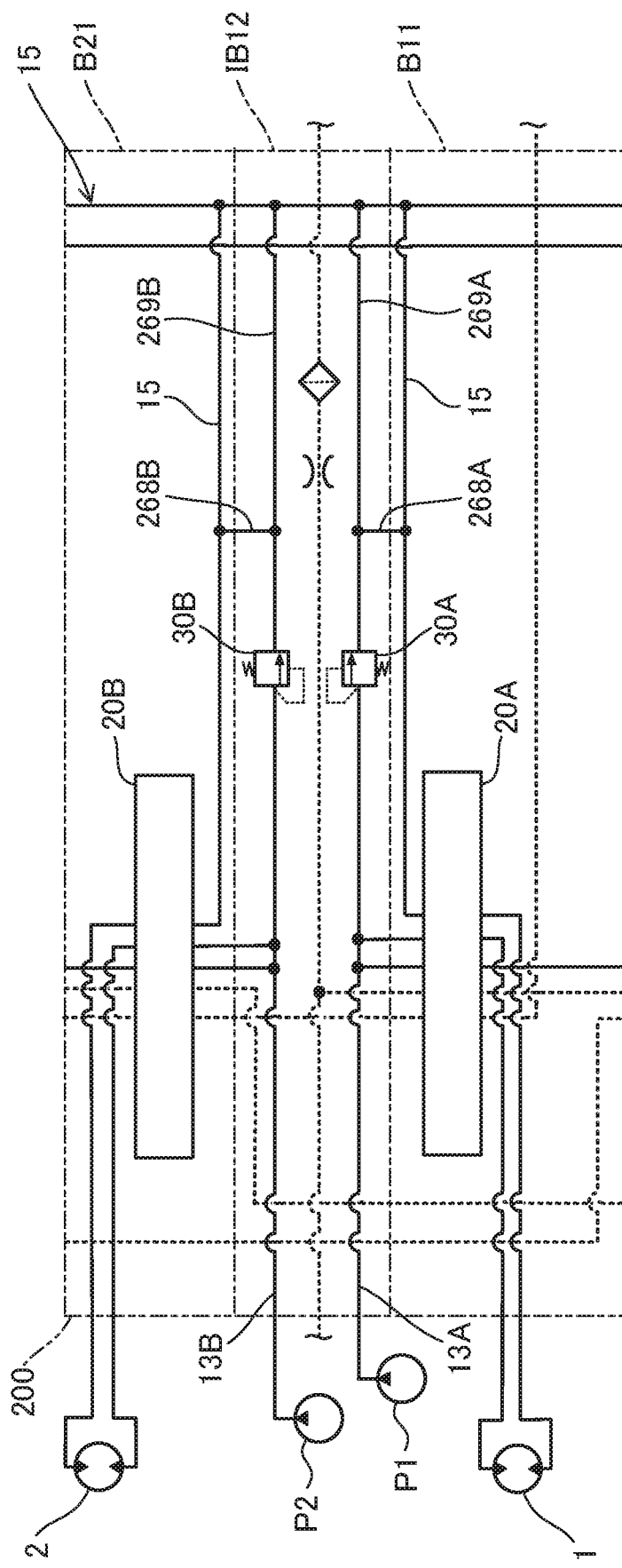
FIG. 6 is a partially enlarged view of a fluid pressure control system including the valve device according to a second embodiment of the present invention and illustrates hydraulic circuits of an inlet block IB12, a valve block B11, and a valve block B12 of the valve device.

As illustrated in FIG. 6, the valve device 200 is provided with a main relief passage 269A connecting the first main relief valve 30A and the tank passage 15 and a sub relief passage 268A branching from the main relief passage 269A and connecting the first main relief valve 30A and the tank passage 15 separately from the main relief passage 269A. Moreover, the valve device 200 is provided with a main relief passage 269B connecting the second main relief valve 30B and the tank passage 15 and a sub relief passage 268B branching from the main relief passage 269B and connecting the second main relief valve 30B and the tank passage 15 separately from the main relief passage 269B.

The sub relief passage 268A is connected to the tank passage 15 connecting the first running control valve 20A and the tank T in the valve block B11 adjacent to the inlet block IB12. The sub relief passage 268B is connected to the tank passage 15 connecting the second running control valve 20B and the tank T in the valve block B21 adjacent to the inlet block IB12. Since a structure of a portion where the first and second main relief valves 30A and 30B are mounted in the inlet block IB12 is substantially similar to that of the inlet block IB3, description will be omitted.

According to the second embodiment as above, since the total sectional area of the channel through which the working oil that is relieved from the first and second main relief valves 30A and 30B flows can be made larger similarly to the first embodiment, the flow velocity of the relieved working oil can be reduced. As a result, occurrence of a noise when the first and second main relief valves 30A and 30B are relieved can be prevented. Moreover, the working oil that is relieved from the first and second main relief valves 30A and 30B can be discharged to the tank T thorough the tank passage 15 of the valve blocks B12 and B21 adjacent to the inlet block IB12. Thus, there is no need to newly provide a plurality of passages directly connecting the first and second main relief valves 30A and 30B and the tank T in the inlet block IB12. Thus, a size increase of the inlet block IB12 can be prevented.

Variations as below are also within a scope of the present invention, and the configurations illustrated in the variations and the configurations described in the aforementioned embodiments can be combined, the configurations described in the aforementioned different embodiments can be combined, and the configurations described in the following different variations can be also combined.

<Variation 1>

In the aforementioned embodiments, the case where the working oil that is relieved from the main relief valve is led not only to the main relief passage in the block into which the main relief valve is assembled but also to the sub relief passage in the block adjacent to the block into which the main relief valve is assembled was described, but the present invention is not limited to that. The working oil that is relieved from the main relief valve may be discharged not only to the main relief passages in the block into which the main relief valve is assembled but also to the tank passage in the block into which the main relief valve is assembled through the sub relief passage in the block into which the main relief valve is assembled. For example, a plurality of passages configured to lead the working oil relieved from the third main relief valve 30F to the tank passage 15 of the inlet block IB3 may be formed only inside the inlet block IB3.

<Variation 2>

In the aforementioned embodiments, the case where the working oil that is relieved from the main relief valve is led to the sub relief passages of the valve blocks adjacent to both sides of the inlet block was described, but the present invention is not limited to that. It may be so configured that the working oil that is relieved from the main relief passage is led to the sub relief passage of one of valve blocks in the valve blocks adjacent to the both sides of the inlet block.

<Variation 3>

In the aforementioned embodiments, the structure in which the valve block includes the overload relief valve with makeup was described, but the makeup function does not have to be included. Moreover, as the makeup function, only a check valve may be included in the structure.

The configuration, actions and effects of the embodiments of the present invention configured as above will be described collectively.

The valve devices 100 and 200 include the first, second, and third main relief valves (relief valves) 30A, 30B, and 30F configured to be opened when the pressures in the first, second, and third circuit systems (fluid pressure circuits) C1, C2, and C3 reach the predetermined pressure and to relieve the working oil (working fluid), the tank passage 15 connected to the tank T, the main relief passages 169, 269A, and 269B connecting the first, second, and third main relief valves 30A, 30B, and 30F and the tank passage 15, and the sub relief passages 168, 268A, and 268B branching from the main relief passages 169, 269A, and 269B and connected to the tank passage 15 separately from the main relief passages 169, 269A, and 269B.

In this configuration, since the working oil can be relieved to the tank passage 15 through the main relief passages 169, 269A, and 269B and the sub relief passages 168, 268A, and 268B, the total sectional area of the channel through which the working oil relieved from the first, second, and third main relief valves 30A, 30B, and 30F flows can be made larger than the case where the working oil is relieved to the tank passage 15 only through the main relief passages 169, 269A, and 269B. As a result, since the flow velocity of the working oil passing through the channel on the downstream sides of the first, second, and third main relief valves 30A, 30B, and 30F can be reduced, occurrence of a noise when the working oil is relieved from the first, second, and third main relief valves 30A, 30B, and 30F can be prevented.

The valve devices 100 and 200 include the inlet blocks (main blocks) IB12 and IB3 having the first, second, and third main relief valves 30A, 30B, and 30F and the main relief passages 169, 269A, and 269B and the valve blocks (sub blocks) B11, B21, B23, and B32 adjacent to the inlet blocks IB12 and IB3, and the sub relief passages 168, 268A, and 268B are formed across the inlet blocks IB12 and IB3 and the valve blocks B11, B12, B23, and B32.

In this configuration, the working oil that is relieved from the first, second, and third main relief valves 30A, 30B, and 30F provided in the inlet blocks IB12 and IB3 can be discharged to the tank passage 15 through the sub relief passages 168, 268A, and 268B of the adjacent valve blocks B11, B21, B23, and B32. As a result, since there is no need to newly provide a plurality of passages directly connecting the main relief passages 169, 269A, and 269B of the inlet blocks IB12 and IB3 and the tank T, size reduction of the inlet blocks IB21 and IB3 can be realized.

In the valve device 100, the valve blocks B23 and B32 have the cylinder control valves (control valves) 25C and 25E configured to control supply/discharge of the working oil to/from the hydraulic cylinders (actuators) 3C and 3E and the overload relief valves with makeup (overload relief valves) 31b and 32b configured to be opened when the load pressures of the hydraulic cylinders 3C and 3E reach the predetermined pressure and to relieve the working oil through the sub relief passage 168.

In this configuration, since the working oil relieved from the overload relief valves 31b and 32b with makeup of the valve blocks B23 and B32 can be also discharged through the main relief passage 169 on the downstream side of the third main relief valve 30F of the inlet block IB3, occurrence of a noise when the overload relief valves 31b and 32b with makeup are relieved can be also prevented.

In the valve devices 100 and 200, the accommodating portion 136F in which the valve elements 135F of the first, second, and third main relief valves 30A, 30B, and 30F are accommodated are formed in the inlet blocks IB12 and IB3, and the main relief passages 169, 269A, and 269B have the accommodating portion 136F, and the sub relief passages 168, 268A, and 268B have the through holes 162F and 163F connected from the surface abutting on the valve blocks B11, B21, B23, and B32 in the inlet blocks IB12 and IB3 to the accommodating portion 136F.

In this configuration, since the working oil branches and flows to the main relief passages 169, 269A, and 269B and the sub relief passages 168, 268A, and 268B from the accommodating portion 136F, occurrence of a noise can be prevented effectively.

In the valve device 100, the inlet block IB3 is formed to include the accommodating portion (first accommodating portion) 136F in which the valve element 135F of the third main relief valve 30F is accommodated and the through holes 162F and 163F opened in the side surface in the width direction of the inlet block IB3 and connected to the accommodating portion 136F, the valve blocks B23 and B32 are formed to include the accommodating portions (second accommodating portions) 136C and 136E in which the valve bodies 135C and 135E of the overload relief valves 31b and 32b with makeup are accommodated and the through holes 163C and 162E opened in the side surfaces in the width direction of the valve blocks B23 and B32 and connected to the accommodating portions 136C and 136E, and the sub relief passage 168 is formed by the through holes 162F and 163F of the inlet block IB3 and the through holes 163C and 162E of the valve blocks B23 and B32.

In this configuration, when the third main relief valve 30F of the inlet block IB3 is opened, since the working oil branches and flows from the accommodating portion 136F to the main relief passage 169 and the sub relief passage 168, occurrence of a noise can be prevented effectively. Moreover, when the overload relief valves 31b and 32b with makeup of the valve blocks B23 and B32 are opened, the working oil branches and flows from the accommodating portions 136C and 136E to the sub relief passage 168 and the main relief passage 169 of the inlet block IB3 and thus, occurrence of a noise can be prevented effectively. Moreover, the sub relief passage 168 can be formed only by forming the through holes 162F and 163F of the inlet block IB3 and the through holes 163C and 162E of the valve blocks B23 and B32. As a result, since the sub relief passage 168 can be formed easily without a labor in machining, a manufacturing cost of the valve device 100 can be reduced. Moreover, since the sub relief passage 168 is formed in the width directions of the inlet block IB3 and the valve blocks B23 and B32, an influence on the other structures in the valve device 100 is also small.

In the valve devices 100 and 200, the first, second, and third main relief valves 30A, 30B, and 30C are configured to regulate the pressure of the working oil discharged from the first, second, and third pumps (pumps) P1, P2, and P3.

In this configuration, noises in the valve devices 100 and 200 can be reduced by connecting the downstream sides of the first, second, and third main relief valves 30A, 30B, and 30F having particularly large relief flowrates at relief to the tank passage 15 not only through the main relief passages 169, 269A, and 269B but also through the sub relief passages 168, 268A, and 268B.

Although the embodiment of the present invention has been described above, the above embodiment is merely an illustration of one exemplary application of the present invention and is not intended to limit the technical scope of the present invention to the specific configuration of the above embodiment.

The present application claims a priority based on Japanese Patent Application No. 2018-015177 filed with the Japan Patent Office on Jan. 31, 2018, and all the contents of this application are incorporated herein by reference.

The invention claimed is:

1. A valve device, comprising:
   a fluid pressure circuit including a plurality of control valves and a plurality of valve blocks, each of the plurality of control valves being provided a respective one of the plurality of valve blocks and being configured to control supply/discharge of a working fluid to/from a respective one of a plurality of actuators;
   a relief valve configured to be opened when a pressure in the fluid pressure circuit reaches a predetermined pressure, in order to discharge a working fluid from the fluid pressure circuit;
   a tank passage connecting a tank and the plurality of control valves;
   a main relief passage connecting the relief valve and the tank passage; and
   a sub relief passage branching from the main relief passage and connected to the tank passage separately from the main relief passage.

2. The valve device according to claim 1, further comprising:
   a main block having the relief valve and the main relief passage, wherein at least one adjacent valve block among the plurality of valve blocks is disposed adjacent to the main block, and the sub relief passage is formed across the main block and the adjacent valve block.

3. The valve device according to claim 2, wherein the at least one adjacent valve block each includes:
   one of the plurality of control valves configured to control supply/discharge of the working fluid to/from a corresponding one of the plurality of actuators; and
   an overload relief valve configured to be opened when a load pressure of the actuator reaches a predetermined pressure, in order to discharge the working fluid from the corresponding one of the plurality of actuators through the sub relief passage.

4. The valve device according to claim 2, wherein the main block includes an accommodating portion in which a valve element of the relief valve is accommodated;
   the main relief passage has the accommodating portion; and
   the sub relief passage has a through hole connecting a surface of the main block that abuts a closest one of the at least one adjacent valve block to the accommodating portion.

5. The valve device according to claim 3, wherein:
   the main block includes:
      a first accommodating portion in which a valve element of the relief valve is accommodated; and
      a through hole opened in a side surface in a width direction of the main block and connected to the first accommodating portion,
   the at least one adjacent valve including:
      a second accommodating portion in which a valve element of the overload relief valve is accommodated; and
      a through hole opened in a side surface in the width direction of the at least one adjacent valve and connected to the second accommodating portion, and
   the sub relief passage is formed by the through hole of the main block and the through hole of the sub block.

6. The valve device according to claim 1, wherein the relief valve is a main relief valve configured to regulate a pressure of the working fluid discharged from a pump.

7. The valve device according to claim 1, further comprising:
   a plurality of circuit systems, one of the plurality of circuit systems including the fluid pressure circuit, wherein
   the tank passage is formed across the plurality of circuit systems.

\* \* \* \* \*